United States Patent
Scherson (10) Patent No.: US 10,240,242 B2
(45) Date of Patent: Mar. 26, 2019

(54) BROMIDE REMOVAL FROM AQUEOUS SOLUTIONS

(71) Applicant: Case Western Reserve University, Cleveland, OH (US)

(72) Inventor: Daniel A. Scherson, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 185 days.

(21) Appl. No.: 15/510,926

(22) PCT Filed: Sep. 11, 2015

(86) PCT No.: PCT/US2015/049697
§ 371 (c)(1),
(2) Date: Mar. 13, 2017

(87) PCT Pub. No.: WO2016/040810
PCT Pub. Date: Mar. 17, 2016

(65) Prior Publication Data
US 2017/0247801 A1      Aug. 31, 2017

Related U.S. Application Data (60) Provisional application No. 62/049,092, filed on Sep. 11, 2014.

(51) Int. Cl.
*C02F 1/26* (2006.01)
*C25B 1/24* (2006.01)
(Continued)

(52) U.S. Cl.
CPC ............ *C25B 1/24* (2013.01); *B01D 11/0419* (2013.01); *B01D 11/0492* (2013.01); *C02F 1/26* (2013.01); *C02F 1/469* (2013.01); *C02F 1/46109* (2013.01); *C25B 9/00* (2013.01); *C25B 9/06* (2013.01); *C25B 11/035* (2013.01); *C02F 2001/46123* (2013.01);
(Continued)

(58) Field of Classification Search
CPC ... C25B 1/24; B01D 11/0419; B01D 11/0492; C02F 1/26; C02F 1/46109; C02F 1/469
See application file for complete search history.

(56) References Cited

U.S. PATENT DOCUMENTS

| | | |
|---|---|---|
| 3,806,368 A | 4/1974 | Maricle et al. |
| 4,203,814 A | 5/1980 | Grantham |

(Continued)

OTHER PUBLICATIONS

Sun et al., "Selective oxidation of bromide in wastewater brines from hydraulic fracturing," Water Research, 47 (2013) pp. 2723-3731 (Year: 2013).*

(Continued)

*Primary Examiner* — Nicholas A Smith
(74) *Attorney, Agent, or Firm* — Tarolli, Sundheim, Covell & Tummino LLP (57) ABSTRACT

Systems and processes for removing and purifying bromide from an aqueous bromide solution are described. Electrochemistry is used to either convert bromide to bromine to allow its extraction in an organic phase, or to cause deposition of bromine onto an electrode. In either case, once removed from the aqueous bromide solution, the bromide can be recovered and purified.

22 Claims, 7 Drawing Sheets

(51) Int. Cl.
  *C25B 9/00* (2006.01)
  *C25B 9/06* (2006.01)
  *B01D 11/04* (2006.01)
  *C02F 1/461* (2006.01)
  *C02F 1/469* (2006.01)
  *C25B 11/03* (2006.01)
  *C02F 101/12* (2006.01)

(52) U.S. Cl.
  CPC ............ *C02F 2001/46133* (2013.01); *C02F 2001/46161* (2013.01); *C02F 2101/12* (2013.01); *C02F 2201/4618* (2013.01)

(56) References Cited

U.S. PATENT DOCUMENTS

| | | |
|---|---|---|
| 4,320,179 A | 3/1982 | Hart |
| 5,607,619 A | 3/1997 | Dadgar et al. |

OTHER PUBLICATIONS

Kimbrough et al., "Electrochemical removal of bromide and reduction of THM formation potential in drinking water," Water Research, 36 (2002) pp. 4902-4906 (Year: 2002).*

International Search Report and Written Opinion for corresponding PCT Application No. PCT/US2015/049697.

* cited by examiner

BROMIDE REMOVAL FROM AQUEOUS SOLUTIONS

RELATED APPLICATION DATA

This application claims the benefit of U.S. Provisional Application Ser. No. 62/049,092, filed Sep. 11, 2014, which is incorporated by reference herein.

GOVERNMENT FUNDING

This invention was made with government support under the grant(s) CHE1412060 awarded by the National Science Foundation. The government has certain rights in the invention.

BACKGROUND OF THE INVENTION

Bromide ($Br^-$) is ubiquitous in natural waters and waters impacted by anthropogenic activities including discharge of treated or untreated wastewaters, the releases from coal-fired power plants and hydraulic fracturing operations, and sea water intrusion. Although $Br^-$ in drinking water has no direct public health ramifications, it can lead to formation of regulated disinfection byproducts (DBPs) during water treatment, such as bromate ($BrO_3^-$), brominated trihalomethanes (THM) and brominated haloacetic acids (HAA). $BrO_3^-$ is formed during ozonation, while brominated THMs and HAAs can be formed during chlorination. Brominated DBPs are more cyto- and geno-toxic than their chlorinated analogs. Bromate anions are highly toxic for humans and, according to the World Health Organization (WHO), 25 µg/L is the maximum concentration permitted in drinking water. The potential health risks of DBPs have raised concerns, and increasingly stringent regulations are imposed for some DBPs under the Disinfectants/Disinfection Byproduct Rule (D/DBPR) of United States Environmental Protection Agency.

Various alternatives have recently been proposed to remove halide anions such as bromide from drinking water, but none of them have proven sufficiently effective for large-scale application. In a previous study, the efficacy of Ag-doped carbon aerogels in removing chloride, bromide, and iodide anions from surface and mineral waters was analyzed. Sánchez-Polo et al., Water Res., 41(5):1031-7 (2007). The results obtained indicated a high adsorption capacity (7.32 µmol halide/g aerogel) for the carbon aerogel. However, the results obtained also showed that the percentage of Ag adsorption sites available to halides anions was very low, indicating that most of the Ag(I) adsorption sites were not accessible for the halide adsorption process, possibly because of the low surface area of the materials used (500 $m^2/g$). Numerous other materials, including metal impregnated sorbents (e.g. zeolite and alumina), activated carbons (ACs), activated carbon fibers, and anion exchange resins have been evaluated for removal of Br– from water. However, there is as yet no well-established technology to control $Br^-$ at water treatment plants.

There is also a need for providing purified bromine or bromide, since bromine is useful in many industrial processes. While bromide is an undesirable contaminant in natural waters and waste water, bromide content in aqueous fluids of these types is typically very dilute. Accordingly, there is a need for a process for removing and purifying bromide ions from aqueous sources.

SUMMARY OF THE INVENTION

The present invention is directed to the removal and purification of bromide from an aqueous solution. In one aspect, the method involves the use of an electrode made out of either platinum or other materials placed at the interface between the aqueous solution containing bromide and a non-miscible organic solvent such as carbon tetrachloride ($CCl_4$). The electrode is polarized at a potential sufficiently positive to promote the oxidation of bromide to yield bromine, which then partitions between the two phases. Due to the much higher solubility of bromine in the organic solvent as compared with the aqueous phase, most of the bromine will migrate to the organic phase where it can be recovered by conventional means. Only bromine migrates to the organic phase, resulting in a selective transport. Preferably a thin layer of organic solvent is used. In some embodiments, the invention is capable of removing sufficient bromide such that the bromide content of the depleted aqueous solution is less than 100 ppm, while the bromide content of the product solution is 35 weight percent or more. In addition, the chloride content of the product can be less than 3 weight percent. The efficiency of the process can be improved by using a set-up in which the two liquids flow continuously and along the same direction to replenish bromide in the aqueous phase and expose fresh organic solvent across the reactive surface. In some embodiments, the method is capable of processing from 10 to 70 $m^3$ of aqueous solution (e.g., brine) per hour.

Another aspect of the invention is directed to the removal and purification of bromides from an aqueous solution using the selective electro-sorption of the bromides on a substrate and desorption into a second water phase can be used to obtain bromide from an aqueous solution. Electrochemistry of anodic bromine formation on platinum has been previous described. See Conway et al., J. Chem. Soc. Faraday Trans. 91, 283-293 (1995). In some embodiments, this can be carried out as a continuous process for the extraction of bromide from solutions containing among other anions, chloride, nitrate, and sulfate and also a few cations, including magnesium, calcium and sodium. This method relies on electrochemical principles for the selective adsorption of bromide ions on the surface of certain metals and its subsequent desorption in a media devoid of bromide. Silver and bismuth are especially suited for use in electrodes. In particular, both these metals are known to adsorb bromide in preference to all the other species such as chlorides, sulfates, and nitrates, and to desorb bromide at potentials positive to that at which hydrogen would be evolved. Such metal electrodes in the form of foils, for example, can be immersed into the aqueous stream solution, and then polarized at various potentials to promote bromide adsorption within the range in which the metals are stable, i.e. negative to the onset of their dissolution. Subsequently, the electrodes will be removed from the stream solution under potential control and later immersed in a water solution and polarized at sufficiently negative potentials to induce the full desorption of bromide from the electrode surface.

BRIEF DESCRIPTION OF THE FIGURES

The present invention may be more readily understood by reference to the following figures wherein.

DETAILED DESCRIPTION OF THE INVENTION

Definitions

Unless otherwise defined, all technical and scientific terms used herein have the same meaning as commonly understood by one of ordinary skill in the art to which this application pertains. Although methods and materials similar or equivalent to those described herein can be used in the practice or testing of the exemplary embodiments, suitable methods and materials are described below. In case of conflict, the present specification, including definitions, will control. In addition, the materials, methods, and examples are illustrative only and not intended to be limiting.

The terminology as set forth herein is for description of the embodiments only and should not be construed as limiting the application as a whole. Unless otherwise specified, "a," "an," "the," and "at least one" are used interchangeably. Furthermore, as used in the description of the application and the appended claims, the singular forms "a", "an", and "the" are inclusive of their plural forms, unless contraindicated by the context surrounding such.

The recitations of numerical ranges by endpoints include all numbers subsumed within that range (e.g., 1 to 5 includes 1, 1.5, 2, 2.75, 3, 3.80, 4, 5, etc.).

Removing and Purifying Bromide From an Aqueous Bromide Solution Using a Liquid-Liquid Extraction Electrochemical Method In one aspect, the present invention provides a process for removing and purifying bromide from an aqueous bromide solution. The process includes the steps of contacting an aqueous bromide solution with a suitable organic solvent and an electrode positioned between the aqueous bromide solution and the suitable organic solvent; applying a positive voltage to the electrode causing bromine to form and migrate into the suitable organic solvent to form a concentrated organic bromine solution; and removing the concentrated organic bromine solution from contact with the aqueous bromide solution and the electrode. This process is in some instances referred to herein as the liquid-liquid extraction electrochemical method.

Figure 1:
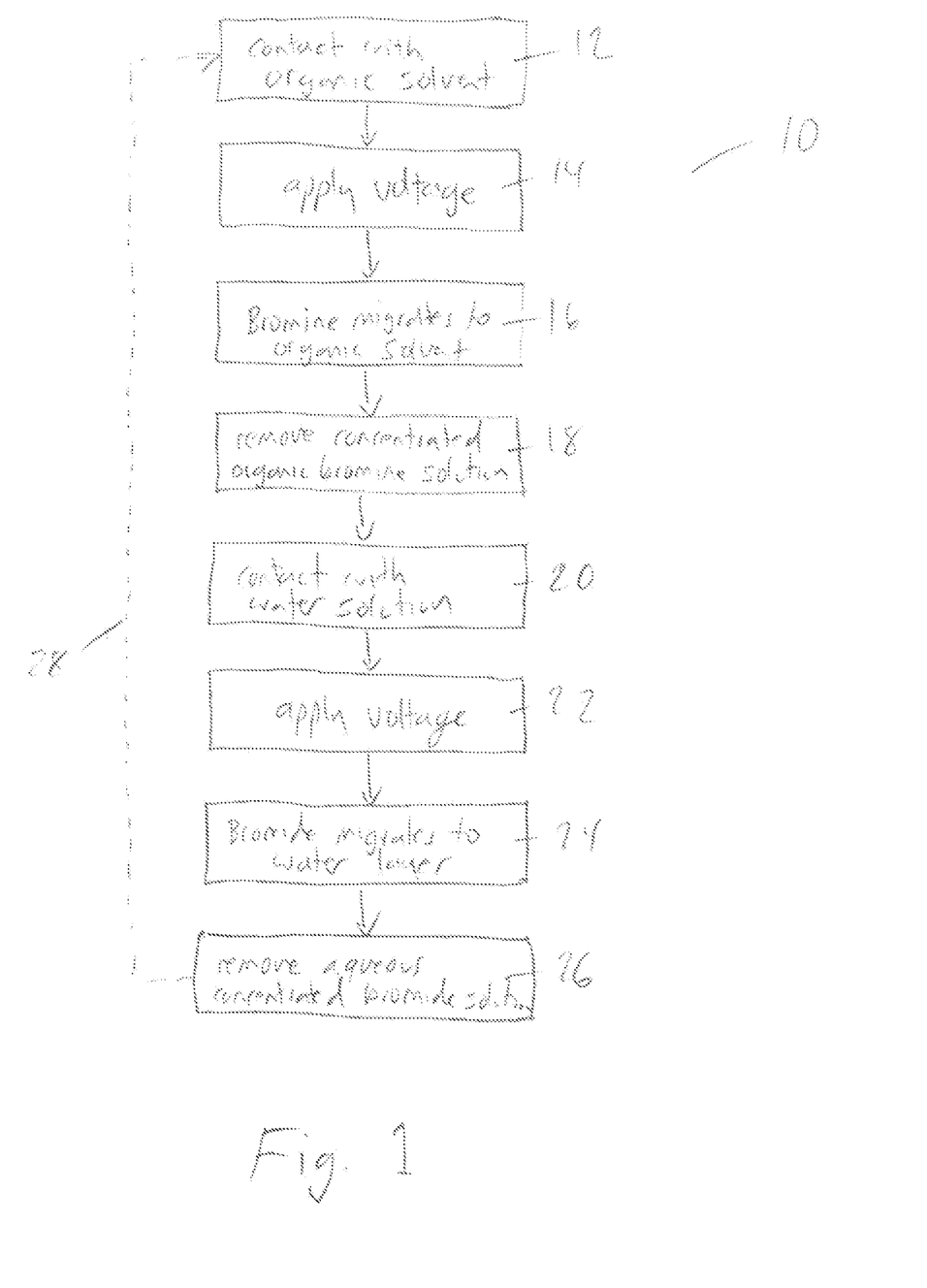
FIG. 1 provides a flowchart showing the steps involved in the process of removing and purifying bromide from an aqueous bromide solution using a liquid-liquid extraction electrochemical method.

FIG. 1 provides a flowchart showing the process 10 for removing and purifying bromide from an aqueous bromide solution using the liquid-liquid extraction electrochemical method. The first step 12 of the process is contacting an aqueous bromide solution with a suitable organic solvent, and positioning an electrode between the aqueous bromide solution and the suitable organic solvent. An aqueous bromide solution, as used herein, refers to an aqueous solution that includes bromide ions. Typically, the bromide ions are present in a relatively low concentration (e.g., a typical initial concentration of 12.5 mM), and are one of a plurality of types of ions present in the aqueous solution. Examples of aqueous bromide solutions include brine and waste water. The term "brine," as used herein, refers to a concentrated saline solution of sodium chloride and other salts. For example, dead sea end brine contains 20-27 wt % $Cl^-$, 0.75-0.95 wt % $Br^-$, 2-5 wt % $Ca^{+2}$, and 5-7 wt % $Mg^{+2}$.

In step 12, the aqueous bromide solution is contacted with a suitable organic solvent. A suitable organic solvent is one which does not readily mix with the aqueous bromide solution, and in which bromine is readily soluble (e.g., in which bromide has a solubility of at least 0.33 mg/ml (2.065 mM)). Organic solvents are hydrocarbons that are liquid at room temperature. Examples of suitable organic solvents include carbon tetrachloride, chloroform, and carbon disulfide. Because of the immiscible nature of the aqueous solution and the organic solvent, they form two layers when added together, thereby providing the proper conditions for a liquid-liquid extraction.

Step 12 also includes positioning an electrode between the aqueous bromide solution and the suitable organic solvent. By "positioning," what is meant is that when the aqueous bromide solution and the suitable organic solvent are placed in contact with one another, the electrode will be positioned at the interface between the two liquids. This can result from movement of the electrode to the appropriate position, or by adding the aqueous bromide solution and the suitable organic solvent in amounts such that the interface between them forms where the electrode has been previously positioned.

The electrode positioned between the aqueous bromide ($Br^-$) solution and the suitable organic solvent should have a high surface area to improve the efficiency of bromine ($Br_2$) generation, and a composition that is capable of effectively delivering a charge to the bromide. A suitable shape for the electrode would be a flat, porous structure, which provides a high surface area, and can be positioned between the two layers so that it can contact bromide ions, and so that bromine that is formed through action of the electrode can readily migrate into the organic solvent. An example of an electrode that provides a flat, porous structure with a high surface area is a mesh electrode. Another example of an electrode that provides a flat, porous structure with a high surface area is a nanoparticle electrode. In these electrodes, the nanoparticles are imbedded in a conducting substrate that keeps the nanoparticles in position. See Liu, M., and Chen, W., Nanoscale, 5, 122558-12564 (2013). Examples of materials suitable for use in the electrode include platinum and carbon. A preferred material for use in the electrodes of the invention is platinum.

Figure 3:
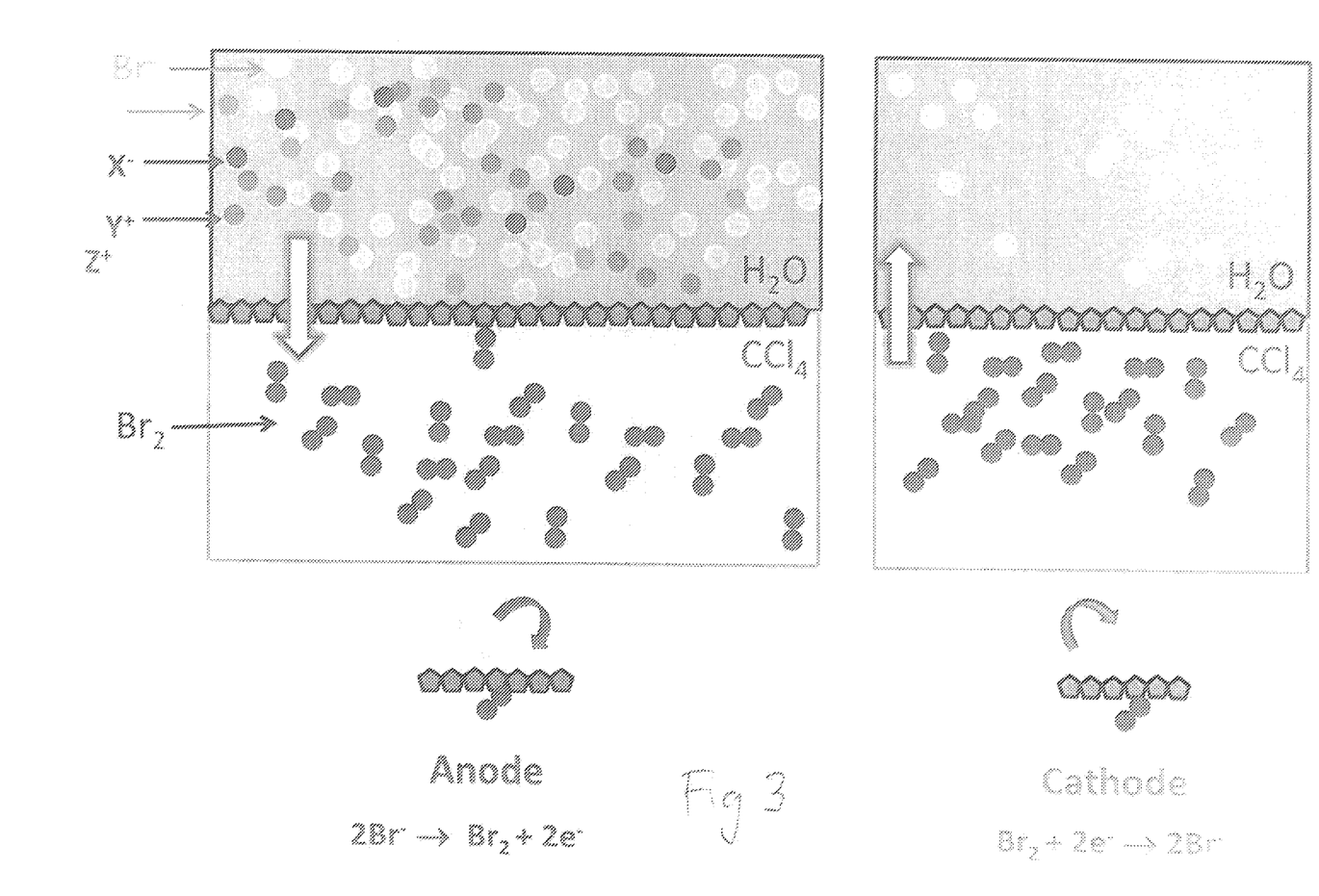
FIG. 3 provides a schematic illustration of a liquid-liquid extraction electrochemical method for removing and purifying bromide from an aqueous bromide solution.

After contacting an aqueous bromide solution with a suitable organic solvent, and positioning an electrode between the aqueous bromide solution and the suitable organic solvent, voltage is applied 14 to the electrode. A positive potential should be applied to the electrode, causing it to function as an anode, in order to stimulate the formation of bromine from bromide, following the reaction $2Br^- \rightarrow Br_2 + 2e^-$. The inventors have determined that bromide is converted to bromine at a much higher level than other types of electrochemical conversion at the electrodes, thereby providing a method to preferentially remove and purify bromide from an aqueous solution. A positive voltage of about 1 to about 1.5 volts versus a hydrogen electrode should be applied to the electrode, with a positive voltage in the range from about 1.2 to about 1.4 volts being preferred. The bromine then migrates 16 to the organic solvent, as shown in FIG. 3.

Migration of the bromine to the organic solvent results in the formation of a concentrated organic bromine solution. The term "concentrated," with regard to the concentrated organic bromine solution, does not imply that an absolutely high level of bromine is present in the organic solution, but rather that the bromine has been isolated into the organic solvent from the aqueous solution. However, it should be noted that a relatively small amount of organic solvent can be used in the liquid-liquid exchange, resulting in a bromine concentration in the organic solvent that is higher than the bromide concentration originally present in the aqueous bromide solution. The concentrated organic bromine solution is then removed 18 from contact with the aqueous bromide solution. In some embodiments, the aqueous bromide solution is first depleted, and the organic bromine solution is removed in a discrete step, by withdrawing or allowing the organic bromine solution to flow away from contact with the depleted aqueous bromide solution. However, in some embodiments, the aqueous bromide solution, the suitable organic solvent, and the concentrated organic bromine solution are in continuous flow, such that fresh organic solvent is being continuously brought into contact with the aqueous bromide solution to form concentrated organic bromine solution, while likewise the aqueous bromide solution is continuously refreshed with non-depleted aqueous bromide solution. In a continuous flow method, the rate of flow within the aqueous bromide solution and the suitable organic solvent should be sufficient to allow a high amount of aqueous bromide solution to be purified, while not being so high as to not allow sufficient time for the bromine to form and migrate to the organic solvent.

Once the concentrated organic bromide solution has been removed 18, the aqueous bromide solution has been effectively purified. In some embodiments, the process may be considered complete at this point. However, in other embodiments, it may be preferable to transfer the bromine back to a water solution, both to regenerate the suitable organic solvent, and to provide a purified bromide solution. Accordingly, in some embodiments, the method further includes the step of contacting 20 the concentrated organic bromine solution with a water solution, as shown in FIG. 1 and FIG. 3. Contacting the water solution with the concentrated organic bromine solution results in the formation of a second liquid-liquid extraction environment. The water solution should include one or more salts for which the ions will not oxidize nor reduce during the bromine to bromide conversion in order to maintain conductivity.

An electrode is positioned between the concentrated organic bromine solution and the water solution as described earlier with regard to the initial liquid-liquid extraction. While the electrode used for this step need not be identical to the electrode used for bromine formation, the types of electrodes described previously will again be suitable for use in this step of the process. For example, a suitable shape for the electrode is again a flat, porous structure that provides a high surface area, and suitable materials include platinum and carbon. A negative voltage is applied 22 to the electrode. A negative voltage of about 1 to about 1.5 volts should be applied to the electrode, causing it to function as a cathode, with a negative voltage in the range from about 1.2 to about 1.4 volts being preferred. This causes the formation of bromide from the bromine in the concentrated organic solution, based on the reaction: $Br_2 + 2e^- \rightarrow 2Br^-$. Because bromide is formed at the interface between the organic solution and the water, and because bromide is substantially more soluble in water than in the organic phase, this causes bromide to form and migrate 24 into the water solution to form a concentrated bromide solution, as shown in FIG. 3.

The concentrated bromide solution is then removed 26 from contact with the concentrated organic bromine solution and the electrode. In some embodiments, the concentrated organic bromine solution is first depleted, and the concentrated bromide solution is removed in a discrete step, by withdrawing or allowing the concentrated bromide solution to flow away from contact with the depleted organic bromine solution. However, in some embodiments, the organic bromine solution, the water solution, and the concentrated bromide solution are in continuous flow, such that fresh water is being continuously brought into contact with the concentrated organic bromine solution to form concentrated bromide solution, while likewise the concentrated organic bromine solution is continuously refreshed with non-depleted concentrated organic bromine solution. In a continuous flow method, the rate of flow within the water solution and the concentrated organic bromine solution should be sufficient to allow a high amount of concentrated bromide solution to be formed. In some embodiments, once the bromine has been converted into bromide and has migrated into the water layer, the depleted concentrated organic bromine solution can be recycled 28 and used as suitable organic solvent for the initial liquid-liquid extraction.

Figure 4:
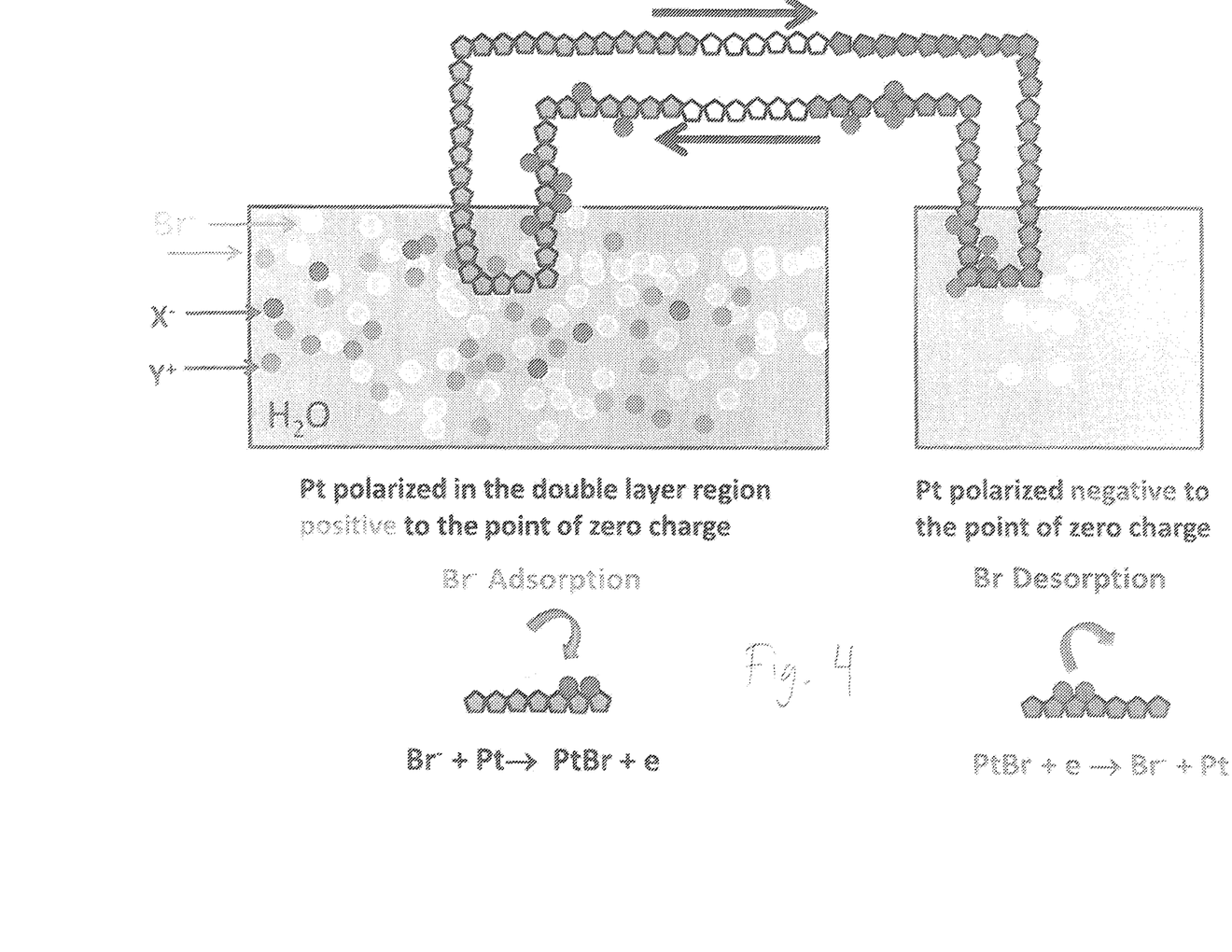
FIG. 4 provides a schematic illustration of a deposition and release electrochemical method for removing and purifying bromide from an aqueous bromide solution.

Removing and Purifying Bromide From an Aqueous Bromide Solution Using a Deposition and Release Electrochemical Method In another aspect, the present invention provides a substantially different process for removing and purifying bromide from an aqueous bromide solution. This process includes the steps of contacting an aqueous bromide solution with an electrode; applying a positive voltage to the electrode to form a bromine-coated electrode where the bromide oxidizes to yield bromine atoms attached to or adsorbed on the electrode surface; moving the bromine-coated electrode to a water solution, and applying a negative voltage to the bromine-coated electrode to reduce the adsorbed bromine atoms, releasing bromide into the water solution, thereby forming a purified bromide solution. This process is in some instances referred to herein as the deposition and release electrochemical method. An overview of this process is shown in FIG. 4.

Figure 2:
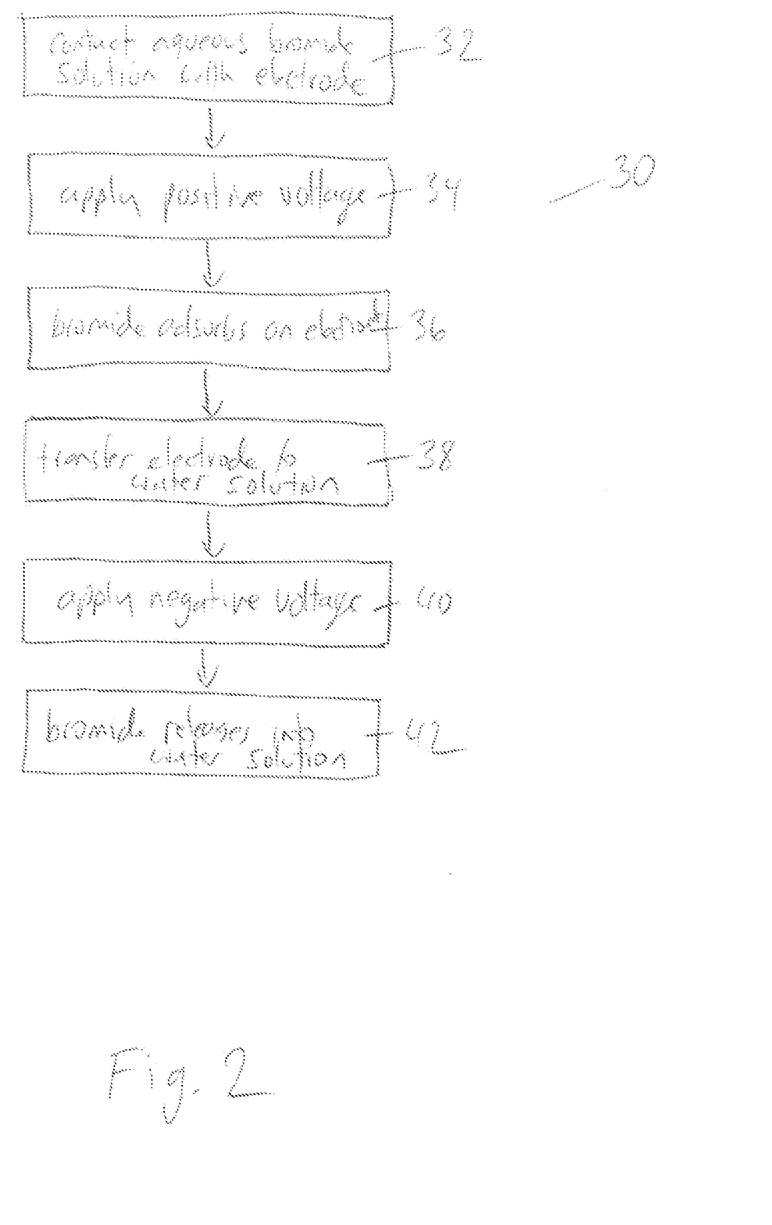
FIG. 2 provides a flowchart showing the steps involved in the process of removing and purifying bromide from an aqueous bromide solution using a deposition and release electrochemical method.

FIG. 2 provides a flowchart showing the process 30 for removing and purifying bromide from an aqueous bromide solution. The first step 32 of the process is contacting an aqueous bromide solution with electrode. An aqueous bromide solution, as used herein, refers to an aqueous solution that includes bromide ions. Typically, the bromide ions are present in a relatively low concentration, and are one of a plurality of types of ions present in the aqueous solution. Examples of aqueous bromide solutions include brine and waste water.

All or a significant portion of the electrode is brought into contact 32 with the aqueous bromide ($Br^-$) solution. In some embodiments, the electrode has a high surface area to improve the efficiency of bromide deposition onto the electrode. The electrode should also have a composition that is capable of effectively extracting a charge from the bromide, and allowing for deposition of atomic bromine onto the electrode. In some embodiments, a mesh electrode can be used. Another example of an electrode that provides a flat, porous structure with a high surface area is a nanoparticle electrode. Examples of materials suitable for use in the electrode include silver, platinum, and bismuth. Ultra-thin silver electrodes used in high power density pulse batteries are suitable for use in the invention. See Jin et al., J. of Power Sources, 102, 124-129 (2001). Preferred materials for use in the electrodes of this aspect of the invention are silver and bismuth.

Once the electrode has been immersed in the aqueous bromide solution, a voltage is applied to the electrode. The positive voltage causes oxidation and deposition 36 of bromine onto the electrode, according to the formula $Br^-+Ag \rightarrow AgBr+e^-$ (using a silver electrode in this example). The voltage used for deposition is typically different from the voltage used to cause bromine formation, as described earlier. For example, a positive voltage of about 0.1 to about 1.0 volts can be applied to the electrode to cause deposition of bromide onto the electrode, thereby forming a bromine-coated electrode, and removing bromide from the aqueous bromide solution to form a depleted aqueous bromide solution.

The bromine-coated electrode is then removed from the aqueous bromide solution and transferred 38 to a water solution. The water solution should include one or more salts for which the ions will not oxidize nor reduce during the bromine to bromide conversion in order to maintain conductivity. The electrode is immersed in the water solution, and a negative voltage is applied 40 to cause release 42 (i.e., desorption) of bromide from the electrode into the water solution, according to the formula $AgBr+e^- \rightarrow Br^-+Ag$. A voltage of about −0.1 to about −1.0 volts can be applied to the electrode to cause release of adsorbed bromine from the electrode into the water solution. Release of bromide into the water solution forms a concentrated bromide solution, which can also be referred to as a purified bromide solution, since the bromide has been rendered pure relative to its mixture with other materials in the initial aqueous bromide solution.

In some embodiments, the aqueous bromide solution is depleted, the bromine-coated electrode is withdrawn, and (typically) the process is repeated with a fresh, unpurified aqueous bromide solution. However, in some embodiments, the aqueous bromide solution and the water solution, and the concentrated bromide solution are in continuous flow, such that aqueous bromide solution continuously flows past a positively polarized electrode, and water solution continuously flows past a negatively polarized electrode. While not necessarily confined to such embodiments, a multi-electrode conveyor belt in which the electrode is a separately polarizable unit can be used. An example of a multi-electrode conveyor belt is shown in FIG. 4. Because the electrodes are separately polarizable, the electrodes positioned in the aqueous bromide solution can be negatively charged while the electrodes positioned in the water solution can be positively charged, while the belt causes the electrodes to be continuously moved from one solution to the other. This allows bromide to be continuously transferred from one stream to the other without interruption.

Systems for Removing and Purifying Bromide From an Aqueous Bromide Solution

Figure 5:
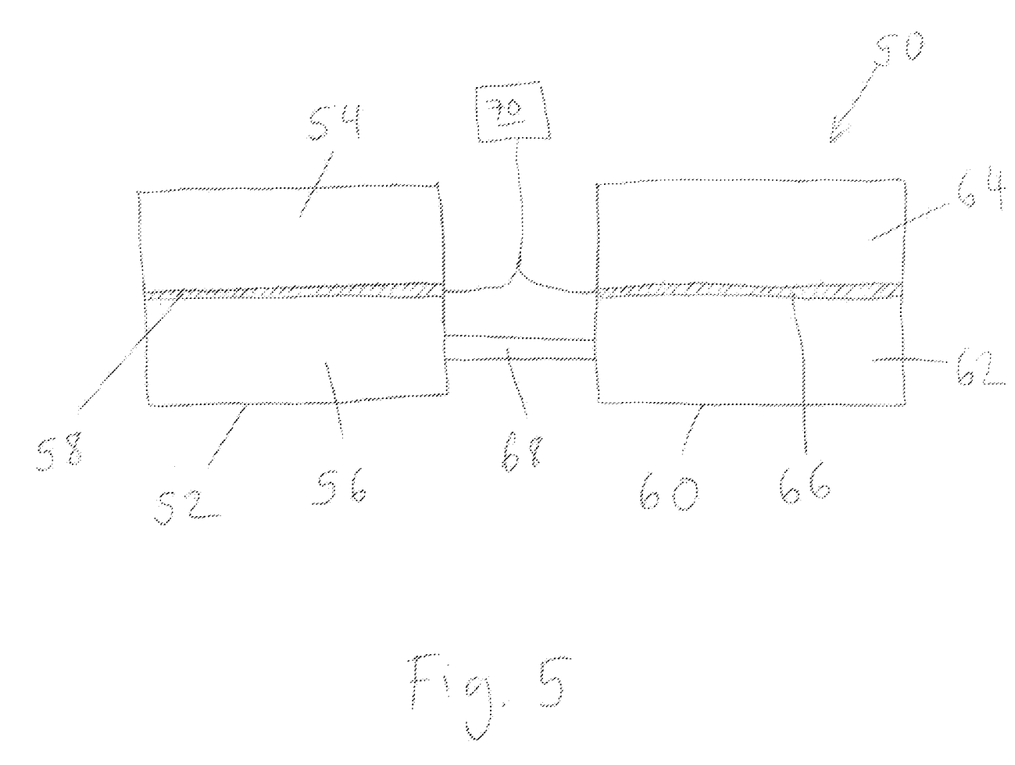
FIG. 5 provides an illustration of a system for removing and purifying bromide from an aqueous bromide solution using an electrode and two liquid-liquid extractions.
Figure 6:
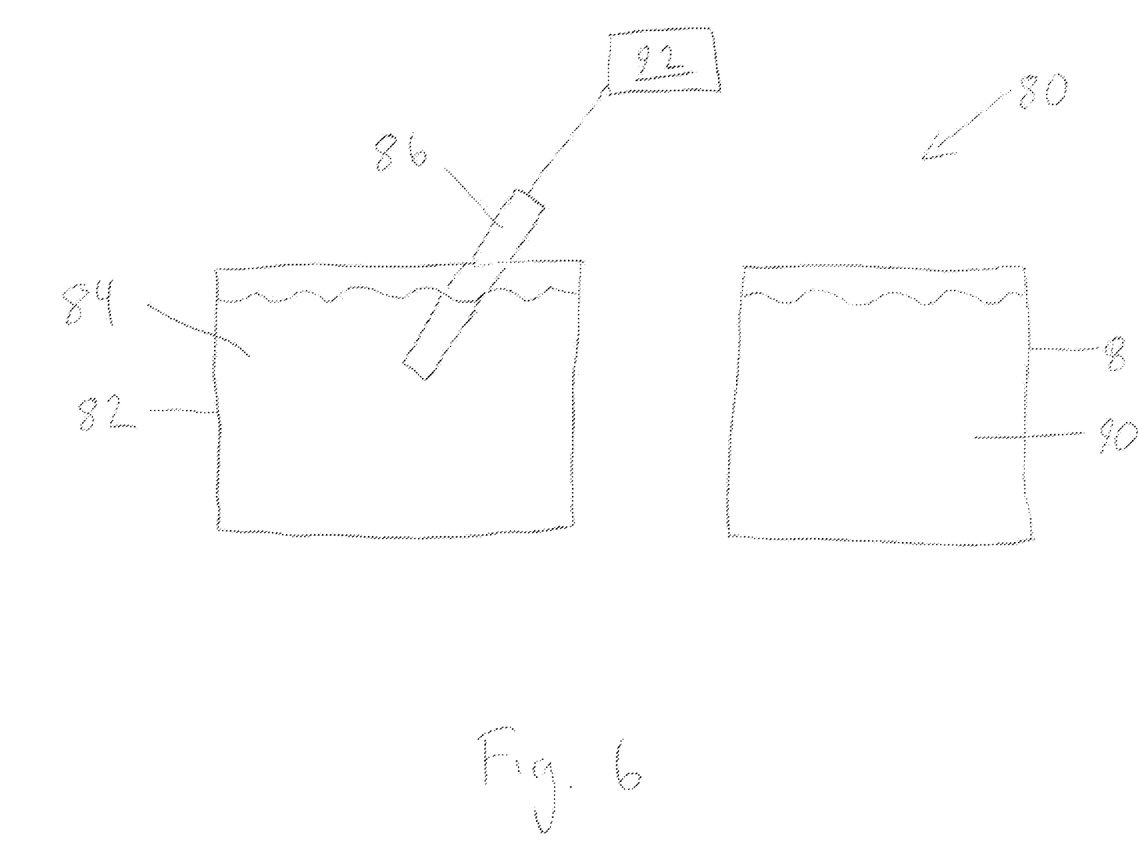
FIG. 6 provides an illustration of a system for removing and purifying bromide from an aqueous bromide solution using deposition and release from an electrode.

Another aspect of the invention provides systems for removing and purifying bromide from an aqueous bromide solution. Embodiments of these systems are shown in FIGS. 5 and 6. Specifically, FIG. 5 illustrates a system 50 for removing and purifying bromide from an aqueous bromide solution using the liquid-liquid exchange process 10 described herein. In this embodiment, the system includes a first container 52 configured to hold an aqueous bromide solution layer 54 and a suitable organic solvent layer 56, and a first electrode 58 positioned between the aqueous bromide solution layer 54 and the suitable organic solvent layer 56. In order to minimize the use of organic solvent, the suitable organic layer 56 can be significantly smaller than the aqueous bromide layer 54. For example, the volume of the layers can have a ratio of 10:1, 20:1, or 50:1 for aqueous to organic volume. As described herein, the suitable organic solvent layer 56 becomes a concentrated organic bromine solution layer upon applying a voltage to the first electrode. The system 50 also includes a second container 60 configured to hold a concentrated organic bromine solution layer 62 and a water solution layer 64, and a second electrode 66 positioned between the concentrated organic bromine solution layer 62 and the water solution layer 64. The first container 52 and second container 60 have walls and an interior that are suitable for holding the electrodes and the aqueous and organic solutions make up the two layers in each container. Non-reactive material such as glass can be used for the walls of the containers. For some embodiments, the system is configured for continuous flow using first and second containers that are integrated into a larger, continuous flow system, while in other embodiments, the system is configured to allow the transfer of organic solvent back from the second container 60 to the first container 52 after bromine has been converted to bromide and has migrated into the water solution layer 64, resulting in regenerated organic solvent.

The system 50 also includes means 68 for transferring the concentrated organic bromine solution layer 62 from the first container 52 to the second container 60. The means can be a conduit or pipe connecting the first and second containers that allow the flow of liquid from one container to the other which can use gravity or a pump to move fluid from one container to the other. Alternately, in some embodiments, the means 68 are siphons or other devices suitable for withdrawing liquid from one container and transferring it to another. The system 50 also includes a power source 70 for applying a voltage to the first electrode 58 and the second electrode 66. Suitable power sources for providing positive and negative potentials in the desired voltage ranges are well known to those skilled in the art.

The system 50 is suitable for carrying out any version of the process 10 described herein. In some embodiments, the suitable organic solvent used in the suitable organic solvent layer is carbon tetrachloride, chloroform, or carbon disulfide. In further embodiments, the first and second electrodes are mesh electrodes, while in yet further embodiments the first and second electrodes comprise platinum.

FIG. 6 illustrates a system 80 for removing and purifying bromide from an aqueous bromide solution according to the deposition and release process 30 described herein. The system 80 includes a first container 82 holding an aqueous bromide solution 84 and an electrode 86, as well as a second container 88 holding water 90. The water contains an inert electrolyte salt which might include bromide. The system 80 also includes a power source 92 for applying a voltage to the electrode 86. The system 80 can be used to remove and purify bromide from an aqueous bromide solution by positioning the electrode 86 in the aqueous bromide solution 84 in the first container 82 and positively polarizing the electrode 86 using the power source 92. Sufficient time should then be allowed to pass for bromide to adhere to the electrode 86 as bromine, based on the electrochemistry described herein. The electrode 86 is then removed from the first container 82 and positioned in the water solution 90 second container 88 and negatively polarizing the electrode

86 using the power source 92 to reduce and release bromide into the water to form a purified bromide solution. Non-reactive material such as glass can be used for the walls of the containers.

The system 80 is suitable for carrying out any version of the process 30 described herein. In some embodiments, the electrode 86 comprises silver or bismuth. In other embodiments, the first and second containers are configured for continuous flow using first and second containers that are integrated into a larger, continuous flow system. In other embodiments, the electrode 86 used in the system comprises a separately chargeable unit of a multi-electrode conveyor belt that is in contact with the solutions in both the first and second containers.

The following examples are included for purposes of illustration and are not intended to limit the scope of the invention.

EXAMPLES

Figure 7:
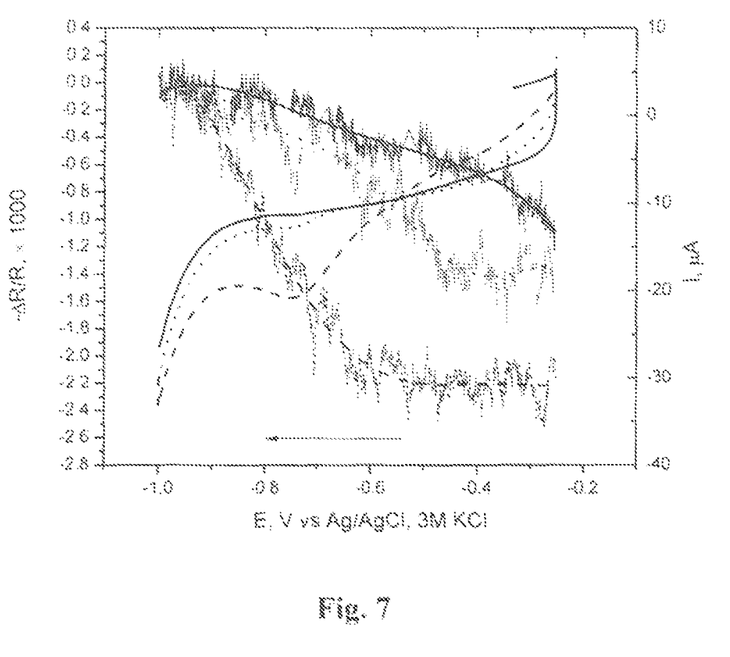
FIG. 7 provides a graph in which the right ordinate shows: Cyclic voltammogram of Ag disk in 0.05 M $NaClO_4$ (solid line), 0.05 M $NaClO_4$+28 mM KCl (dotted line), 0.05 M $NaClO_4$+28 mM KCl+12.5 mM KBr (dashed line), scan rate: 10 mV/s; and the left ordinate shows: the corresponding reflectance signal change, 0.05 M $NaClO_4$ (solid line), 0.05 M $NaClO_4$+28 mM KCl (dotted line), 0.05 M $NaClO_4$+ 28 mM KCl+12.5 mM KBr (dashed line).

Example 1: Optical Verification of Electrochemically Driven Extraction of Bromide From a Solution Containing Large Amounts of Chloride The figure below displays a plot of $\Delta R/R$ referred to as the relative change in the intensity of the light reflected off a surface as a function of the applied potential, E, while the latter was scanned linearly between $-1.0$ and $-0.25$ V vs a AglAgCl (3M) reference electrode. This optical quantity provides a measure of the extent to which a species adsorbs on the surface. As shown in the figure, all $\Delta R/R$ vs E curves show a monotonic decrease indicative of an increase in the surface coverage of anions on the surface, which is far more pronounced for the solution containing chloride (blue) than perchlorate (black). As indicated, addition of bromide to the solution containing chloride elicits an even larger change in $\Delta R/R$ vs E, consistent with the displacement of chloride by bromide on the surface which reflects the much larger affinity of bromide compared to chloride for the silver surface. It may thus be concluded that polarization of a silver electrode in a solution containing chloride leads to the preferential adsorption of bromide over a wide potential range. Note that the concentration of bromide in solution is about half that of chloride as present in many brine sources. Also noteworthy is the fact that at potentials $E > -0.5$ V the optical signal reaches a limiting value indicative of the Ag surface being covered with bromide at saturation coverage. Hence, if one removes the electrode polarized at $E > -0.5$ v it will carry with it a saturation coverage of bromide which if immersed in a solution devoid of bromide and then polarized at $-1.0$ V will lead to the desorption of bromide on the surface which could then be immersed and brought back into the original solution to adsorb bromide again. This cycle could then be repeated leading to the extraction of bromide from the chloride and bromide containing media.

All experiments were carried out at room temperature (290 K) in Ar (UHP, 99.999%, Airgas)-purged aqueous 0.05 M $NaClO_4$ (98% A.C.S. Aldrich chemical) solutions in ultrapure water (18.3 M$\Omega$ cm, EASYpure UV system, Barnstead) either neat or containing either 0.5125 M KBr (Sigma-Aldrich ≥99%) or 1.148 M KCl (Fisher Scientific, assay 100%) to yield final concentrations of 12.5 mM for KBr or 28 mM for KCl.

The all-Teflon cylindrical cell employed for these studies, incorporates an uncoated, fused silica window (Edmund optics 45570) facing down allowing a laser beam (Coherent Inc. Red Eagle 635-10, $\lambda=635$ nm, 10 mW) to impinge at normal incidence on a Ag disk electrode=(1.9 cm in diameter). A beam splitter (EBS1,Thorlabs) was placed between the laser source and the window to monitor the laser intensity independently. A carbon and a silver/silver chloride (3M KCl) inserted into the main body of the cell were used as counter and reference electrodes, respectively. The actual volume of 0.05 M $NaClO_4$ used for these experiments was about 20 ml. Cyclic voltammetry measurements were performed using a bipotentiostat (AFRDES, Pine Instruments) and the data collected with an acquisition card (NI, USB-6009) connected to a personal computer.

For the optical measurements, the intensities of the reflected laser light from the Ag disk electrode as well as than reflecting off the splitter (or reference beam) were measured with two battery-biased Si PIN detectors (DET 10A, Thorlabs).

The complete disclosure of all patents, patent applications, and publications, and electronically available material cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A process for removing and purifying bromide from an aqueous bromide solution, comprising the steps of:
   contacting an aqueous bromide solution with a suitable organic solvent and an electrode positioned between the aqueous bromide solution and the suitable organic solvent;
   applying a positive voltage to the electrode causing bromine to form and migrate into the suitable organic solvent to form a concentrated organic bromine solution; and
   removing the concentrated organic bromine solution from contact with the aqueous bromide solution and the electrode.

2. The process of claim 1, wherein the suitable organic solvent is carbon tetrachloride, chloroform, or carbon disulfide.

3. The process of claim 1, wherein the electrode is a porous electrode.

4. The process of claim 1, wherein the electrode comprises platinum.

5. The process of claim 1, wherein the aqueous bromide solution, the suitable organic solvent, and the concentrated organic bromine solution are in continuous flow.

6. The process of claim 1, wherein the aqueous bromide solution is brine.

7. The process of claim 1, wherein a positive voltage of about 1.2 to about 1.4 volts is applied to the electrode.

8. The process of claim 1, further comprising the steps of contacting the concentrated organic bromine solution with a water solution and an electrode positioned between the concentrated organic bromine solution and the water solution; applying a negative voltage to the electrode to cause bromide to form and migrate into the water solution to form a concentrated bromide solution; and removing the concentrated bromide solution from contact with the concentrated organic bromine solution and the electrode.

9. A system for removing and purifying bromide from an aqueous bromide solution, comprising:
   a first container configured to hold an aqueous bromide solution layer and a suitable organic solvent layer, and a first electrode positioned between the aqueous bromide solution layer and the suitable organic solvent layer, wherein the suitable organic solvent layer becomes a concentrated organic bromine solution layer upon applying a voltage to the first electrode;

a second container configured to hold a concentrated organic bromine solution layer and a water solution layer, and a second electrode positioned between the concentrated organic bromine solution layer and the water solution layer;

means for transferring the concentrated organic bromine solution layer from the first container to the second container; and a power source for applying a voltage to the first electrode and the second electrode.

10. The system of claim 9, wherein the suitable organic solvent used in the suitable organic solvent layer is carbon tetrachloride, chloroform, or carbon disulfide.

11. The system of claim 9, wherein the first and second electrodes are porous electrodes.

12. The system of claim 9, wherein the first and second electrodes comprise platinum.

13. A process for removing and purifying bromide from an aqueous bromide solution, comprising the steps of:

contacting an aqueous bromide solution with an electrode; applying a positive voltage to the electrode to form a bromine-coated electrode as a result of bromine adsorption; moving the bromine-coated electrode to a water solution, and applying a negative voltage to the bromine-coated electrode to release bromide into the water solution, thereby forming a concentrated bromide solution.

14. The process of claim 13, wherein the electrode comprises silver or bismuth.

15. The process of claim 13, wherein the aqueous bromide solution and the water solution are in continuous flow.

16. The process of claim 13, wherein the aqueous bromide solution is brine.

17. The process of claim 13, wherein the electrode comprises a separately polarizable unit of a multi-electrode conveyor belt.

18. The process of claim 13, wherein a positive voltage of about 0.1 to about 1.0 volts is applied to the electrode to form a bromine-coated electrode.

19. A system for removing and purifying bromide from an aqueous bromide solution, comprising:

a first container holding an aqueous bromide solution;

an electrode;

a second container holding water; and a power source for applying a voltage to the electrode;

wherein the purified bromide solution is prepared by positioning the electrode in the first container and positively polarizing the electrode, providing sufficient time for bromine to adhere to the electrode, and then positioning the electrode in the second container and negatively polarizing the electrode to release bromide into the water to form a purified bromide solution.

20. The system of claim 19, wherein the electrode comprises silver or bismuth.

21. The system of claim 19, wherein the electrode comprises a separately polarizable unit of a multi-electrode conveyor belt that is in contact with the solutions in both the first and second containers.

22. The system of claim 21, wherein the first and second containers are configured for continuous flow.

* * * * *